United States Patent [19]
Kotake et al.

[11] Patent Number: 4,733,692
[45] Date of Patent: Mar. 29, 1988

[54] TUBE COUPLING
[75] Inventors: Naoyuki Kotake; Toshio Mikiya, both of Tokyo, Japan
[73] Assignee: Nitto Kohki Co., Ltd, Tokyo, Japan
[21] Appl. No.: 868,995
[22] Filed: May 30, 1986
[30] Foreign Application Priority Data May 30, 1985 [JP] Japan .............................. 60/81545[U]
[51] Int. Cl.⁴ .............................................. F16L 29/00
[52] U.S. Cl. .............................. 137/614.03; 251/335.3; 267/122
[58] Field of Search ........................... 137/614, 614.03; 251/337, 335.3; 267/152, 153, 122, 123, 166

[56] References Cited
U.S. PATENT DOCUMENTS 3,741,598  6/1973  Novak et al. ................. 167/122 X
4,445,539  5/1984  Credle ........................... 137/614.03
4,625,761 12/1986  Uchida et al. .................. 137/614.03

Primary Examiner—A. Michael Chambers
Assistant Examiner—John C. Fox
Attorney, Agent, or Firm—Clifford A. Poff; Thomas H. Murray

[57] ABSTRACT

A tube coupling having a socket and a plug, each having a fluid flow passage extending therethrough, and a valve mounted in the flow passage of at least one of the socket and plug for axial movement between a first position for closing the flow passage and a second position for opening the flow passage said valve being normally biased towards the first position by a spring when the socket and plug are disconnected, and moved to the second position when the socket and plug are coupled together, characterized in that at least those portions of the socket and plug which will be exposed to fluid during the use are formed of fluorocarbon resin, the spring being disposed in said flow passage and comprising bellows made of fluorocarbon resin having continuous helically extending pleats.

1 Claim, 5 Drawing Figures

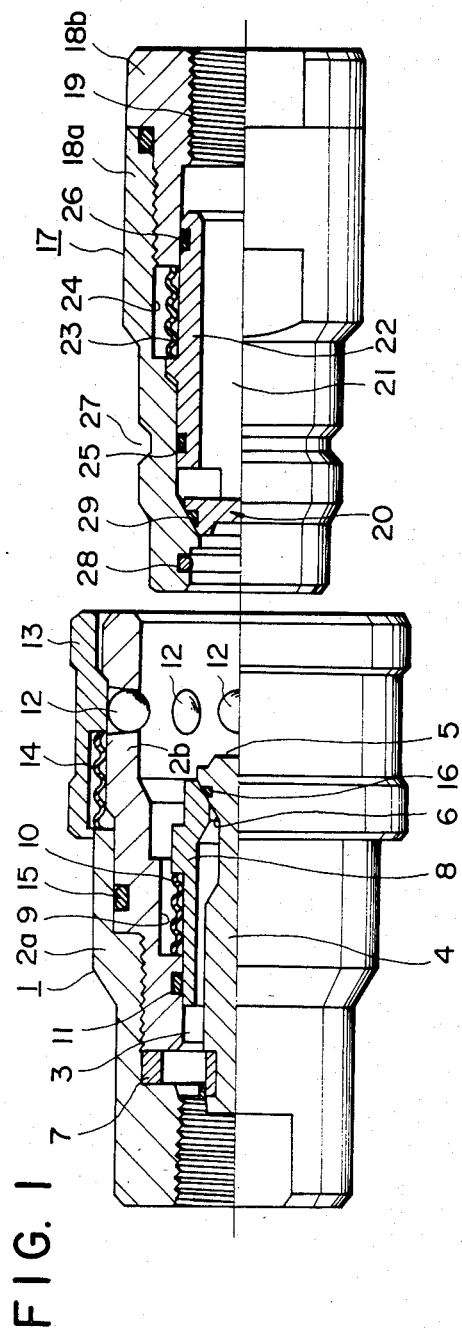
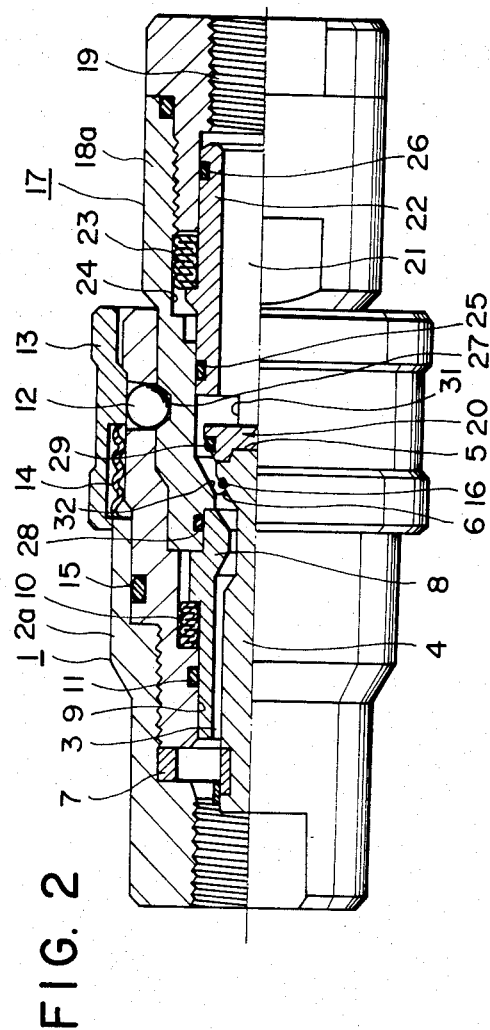
FIG. 1
FIG. 2

TUBE COUPLING

TECHNICAL FIELD

This invention pertains generally to a tube coupling comprising a socket and plug such as a fluid tube coupling having valve means which is spring-biased to be moved to its closed position when the coupling is disconnected and adapted to be moved to its open position when the coupling is connected, and particularly to such tube coupling having high chemical resistance and good sealing properties.

BACKGROUND ART

Tube couplings comprising a socket and plug have been made of metal or plastics depending upon the application intended. However, there is still much to be desired with respect to anti-corrosion properties, temperature resistance and sealing properties.

Valve means for opening and closing flow passage means through the socket and/or plug is usually arranged to be biased toward its closed position by a compression coil spring made of metal and to be retracted to its open position against the biasing force of the coil spring when the tube coupling is connected. However, being made of metal, conventional compression coil springs had the disadvantage that they are susceptible to rust and corrosion as they are exposed to fluid. There is thus a room for improvement on resistance to chemicals and corrosion.

Seal rings are usually mounted in the interior of the socket and/or plug to prevent fluid leakage due to lack of sealing integrity. However, such seal rings usually formed of rubber have weak points with respect to resistance to chemicals, corrosion and temperature. There have been no tube coupling that is suitable for use to handle fluids containing corrosive chemicals such as strong acids.

DISCLOSURE OF INVENTION

In view of the foregoing drawbacks to the prior art tube coupling, an object of the present invention is to provide a tube coupling which is not adversely affected by a fluid being handled if the fluid contains chemicals or whether it may be at a high or low temperature, and which may be used with fluid which is averse to exposure to metal.

It is another object of this invention to provide such tube coupling which provides increased sealing properties.

In order to accomplish the aforesaid objects, the present invention according to one aspect thereof provides a tube coupling having a socket and a plug characterized in that at least those parts of the socket and plug which will be exposed to fluid are formed of fluorocarbon resin.

It has been found that since at least those parts of the socket and plug which are expected to be contacted by fluid are made of fluorocarbon resin such as PTFE or PFA, the tube coupling according to this invention provides high resistance to corrosion or attack by corrosive chemicals, special washing fluids because of the nature of fluorocarbon resin as well as high resistance to temperature and weather. While it is known to form a tube coupling of common plastic materials such as polyamide, polyester or the like, this invention is the first to provide a tube coupling made of fluorocarbon resin, as far as the present inventors know.

According to a second aspect, the invention provides a tube coupling having a socket, a plug and valve means mounted in a flow passage through at least one of the socket and plug for axial movement between a first position for closing the flow passage and a second position for opening the flow passage, said valve means being normally biased towards said first position by compression spring means when said socket and plug are disconnected, and adapted to be moved to said second position when the socket and plug are coupled, characterized in that at least those parts of said socket and plug which will be exposed to fluid are formed of fluorocarbon resin, said compression spring means comprising bellows formed of fluorocarbon resin.

According to this feature of the invention, not only at least those parts of the socket and plug expected to be contacted by fluid are made of fluorocarbon resin such as PTFE or PFA, but also the compression spring is comprised of bellows of similar fluorocarbon resin, so that if a fluid which is averse to exposure to metal contacts with the spring, the fluid is not adversely affected, nor is the spring affected by the fluid.

As indicated above, because of its high resistance to corrosion and chemical attack the tube coupling according to this invention is most suitable for use with fluid, particularly chemicals containing fluid, corrosive and errosive washing luquid or other liquid. In addition, since fluorocarbon resin is also superior in resistance to temperature and weather, the tube coupling finds a wide range of applications, and may also be used with fluid which is averse to contact with metal.

Furthermore, the fluorocarbon resin such as PTFE or PFA of which the coupling is made has anti-friction properties, eliminating the need for applying grease to seal rings used. In this regard as well, the tube coupling of this invention is suitable for use with not only chemicals containing fluid but also pure water or liquid food products.

When the compression spring is made of fluorocarbon resin such as PTFE or PFA, the advantages as stated above may be produced. However, the bellows formed of fluorocarbon resin has the disadvantage in practical use in that it has a low coefficient of elasticity in lateral directions as compared to conventional metal coil springs, requiring in increasing the wall thickness and or diameter of the bellows in order to provide the same level of loading as that obtained by comparable metal coil springs.

Accordingly, in a third aspect of the invention this problem is overcome by providing the bellows of fluorocarbon resin in the form of special bellows configuration having continuous helically extending pleats. The fluorocarbon resin made compression spring in the form of peculiar bellows having continuous helically extending pleats is axially compressed under compressive force just as a usual metal coil spring is compressed under compressive load because the pleats of the bellows are helical, and provides no less valve closing power than the conventional metallic coil spring and yet maintains the valve closing power for an extended period time with repeated operations of connecting and disconnecting the tube coupling. In addition, owing to its configuration having helical pleats, the peculiar bellows type spring is less susceptible to permanent set in fatigue as compared to the usual bellows type spring and may accommodate variation in loading simply by changing the wall thickness of the bellows without the need for varying the diameter of the bellows. Of course, the peculiar bellows type spring, being formed of fluorocarbon resin, is also free from degradation due to chemical attack as is the case with metallic springs, and is highly chemical and corrosion resistant.

According to a fourth aspect, this invention provides a tube coupling having a socket and a plug, at least one of the socket and plug being composed of at least two cylindrical members, characterized in that at least those parts of said socket and plug which will be exposed to fluid are formed of fluorocarbon resin, said two cylindrical members being formed of fluorocarbon resin having different hardnesses, the relatively harder cylindrical member being formed with an annular angular ridge on the surface confronting the less hard cylindrical member so that said ridge bites into the confronting surface of the less hard cylindrical member to establish a seal therebetween when the two cylindrical members are assembled together.

According to this construction, since the harder annular angular ridge bites into the opposing surface of the less hard cylindrical member to form a seal therebetween, there is no need for disposing seal rings of less chemical-resistant rubber between the two cylindrical members as is the case with the prior art tube coupling.

In an alternate embodiment of the invention, a tube coupling is provided comprising a socket and a plug, each including at least one cylindrical member, characterized in that the cylindrical members of said socket and plug being formed of fluorocarbon carbon of different hardnesses, the relatively harder cylindrical member being formed with an annular angular projection on the surface confronting the less hard cylindrical member so that said harder projection is brought into sealing contact with the confronting surface of the less hard cylindrical member when the socket and plug are coupled together.

BRIEF DESCRIPTION OF THE DRAWINGS

These and other objects and features of the present invention will be more fully disclosed in the following description, reference being had to the accompanying drawings, in which:

FIG. 1 is a side view, partly in cross-section, of the tube coupling according to one embodiment of the present invention showing the coupling being disconnected;

FIG. 2 is a view similar to FIG. 1 but showing the coupling being connected;

Like parts are indicated by like reference numbers throughout the drawings.

DETAILED DESCRIPTION OF THE PREFERRED EMBODIMENTS

Figure 3:
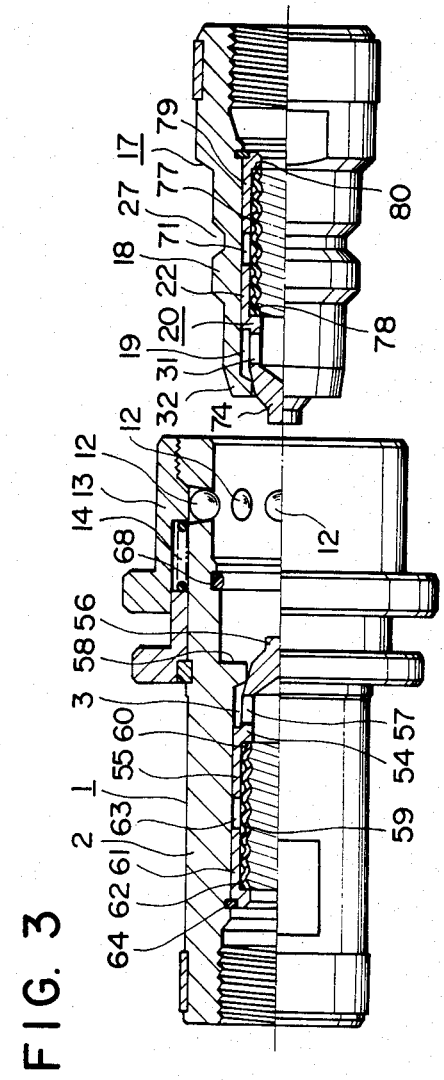
FIG. 3 is a side view, partly in cross-section, of the tube coupling according to another embodiment of the present invention.

Referring first to FIGS. 1 and 2, a tube coupling according to one embodiment of the invention is shown comprising a socket 1 and a plug 17.

The socket 1 basically comprises an outer cylindrical member 2a and an inner cylindrical member 2b fitted one over the other and defining a flow passage 3 therethrough. A solid cylindrical valve seat member is disposed in and coaxially with the flow passage and secured to the cylindrical members 2a, 2b by means of a mounting element 7. The seat member 4 has a valve pushing front face 5 and a valve seat 6 behind the front face. Surrounding the valve seat member 4 and axially slidably mounted on a portion of the interior wall of the inner cylindrical member 2b is a cylindrical valve member 8 which is movable between a closed position in which it is in sealing contact with the valve seat 6 to close the flow passage 3 and an open position in which the valve member is retracted away from the valve seat 6 to open the flow passage.

According to this invention, at least those portions of the socket 1 which will be expected to be exposed to fluid during the use, which are the cylindrical members 2a, 2b, valve seat member 4, mounting piece 7 and valve member 8 in the illustrated embodiment are formed of fluorocarbon resin. Those portions may entirely be made of fluorocarbon resin. Alternatively, only the surfaces of said portions which will be exposed to fluid may be coated with fluorocarbon resin.

Fluorocarbon resins suitable for use in this invention may include PTFE (polytetrafluoroethylene) and PFA (tetrafluoroethylene-perfluoroalkylvinylether copolymer). PVDF (polyvinylidene fluoride) having good workability may also be used.

That portion of the inner wall 9 of the inner cylindrical member 2b which opposes the central part of the valve member 8 intermediate its opposite ends is spaced radially outwardly from the central outer periphery of the valve member to define a space therebetween in which a compression spring 10 surrounding the central periphery of the valve member 8 is disposed under compression between a shoulder formed on the cylindrical member and a shoulder on the valve member to bias the valve member 8 toward the valve seat 6. According to a preferred embodiment of this invention, the compression spring 10 may comprise bellows formed of fluorocarbon resin.

11 is a seal ring disposed between the interior wall of the inner cylindrical member and the outer periphery of the rear end portion of the valve member 8; 12 are locking balls engageable with an outer peripheral groove 27 formed in a plug 17 as will be described below to lock the socket and plug in their coupled position; 13 is a sleeve for depressing the locking balls; 14 is a compression spring for urging the sleeve 13 toward its ball-depressing position; and 15, 16 are seal rings.

The plug 17 comprises an outer cylindrical member 18a and an inner cylindrical member 18b fitted one over the other and defining a flow passage 19 therethrough. A valve member 20 is disposed in the flow passage 19 and axially slidably mounted on the inner walls of the cylindrical members 18a, 18b. The valve member 20 comprises a cylindrical portion 22 having a bore 21 opening at its rear end into the flow passage 19 and closed at its fore end by a disc-like valve head. The bore 21 is in communication with the exterior of the cylindrical portion 22 via ports 31 formed through the cylindrical portion adjacent its fore end.

According to this invention, at least those portions of the plug 17 which will be exposed to fluid during the use, which are the cylindrical members 18a, 18b and the valve member 20 in the illustrated embodiment are formed of fluorocarbon resin. Those portions may entirely be formed of such resin. Or alternatively, only those surfaces of said portions which will contact with fluid may be lined with coatings of fluorocarbon resin.

The valve member 20 is movable between a closed position in which it is in sealing contact with a valve seat 32 formed on the inner wall of the outer cylindrical member 18a to close the flow passage 19 and an open position in which it is disengaged from the valve seat 32 to open the flow passage. That portion of the inner wall 24 of the outer cylindrical member 18a which opposes the central part of the cylindrical portion 20 of the valve member 20 intermediate its opposite ends is spaced radially outwardly from the central outer periphery of the cylindrical portion 22 to define a space therebetween in which a compression spring 23 surrounding the outer periphery of the cylindrical portion 22 is disposed under compression between the front end face of the cylindrical member 18b and a shoulder on the cylindrical member 18a to bias the valve member 20 toward the valve seat 32. According to a preferred embodiment of this invention, the compression spring 23 may comprise bellows formed of fluorocarbon resin.

25 and 26 are seal rings disposed between the inner walls of the outer and inner cylindrical members 18a and 18b and the outer periphery of the cylindrical portion 22 of the valve member; 27 is an annular peripheral groove formed in the outer cylindrical member 18a with which the locking balls 12 are engageable when the socket and plug are coupled together; and 28, 29 are seal rings.

When the socket 1 and plug 17 are coupled together as shown in FIG. 2, the front end of the outer cylindrical member 18a of the plug 17 pushes the valve member 8 of the socket to the open position against the biasing force of the spring 10 while at the some time the front valve pushing face 5 of the valve seat member 4 pushes the valve member 20 of the plug 17 to the open position against the biasing force of the spring 23. The flow passages 3 and 19 of the socket 1 and plug 17 are thus opened and communicated with each other.

FIG. 3 illustrates a tube coupling according to another embodiment of this invention. This tube also comprise a socket 1 and a plug 17.

The socket 1 comprises a main cylindrical body 2 having a flow passage 3 extending therethrough. Axially slidably mounted in the flow passage 3 is a generally cylindrical valve member 54 for opening and closing the flow passage. The valve member 54 comprises a cylindrical portion 55 and a valve head portion or closed front end portion 56, said cylindrical portion being formed with radial fluid ports 57 adjacent the head portion 56. The main cylindrical body 2 has an inner annular protuberance 58 defining a valve seat with which the valve head portion 56 is adapted to be in sealing engagement to close the flow passage 3 in a conventional manner.

A compression spring 59 is compressed between the main cylindrical body 2 and the valve member 54 to urge the latter into abutment with the valve seat 58.

According to this invention, at least those portions of the socket 1 which will be exposed to fluid during the use, which are the main cylindrical member 2, valve member 54 and compression spring 59 in the illustrated embodiment are formed of fluorocarbon resin.

Furthermore, according to the teachings of the present invention, the compression spring 59 comprises a specially-shaped bellows made of fluorocarbon resin having continuous helical pleats or convolutions, instead of conventional simple bellows. One end portion of the compression spring 59 is inserted in the cylindrical portion 55 of the valve member 54 and retained against a shoulder 60 formed on the inner periphery of the cylindrical portion 55 while the other end portion of the spring is accommodated in a tubular spring holder 61 fitted in and fixed to the flow passage 3 and is retained against a shoulder 62 formed around the inner periphery of the spring holder 61. The rear open end of the cylindrical portion 55 of the valve member 54 is normally spaced away from the opposed open end of the spring holder 61 to define therebetween a gap 63 for permitting retraction of the valve 54 to open the flow passage 3 when the socket 1 and plug 17 are coupled together as will be described hereinafter.

64 is a snap ring to retain the spring holder 61. Locking balls 12 are adapted to lockingly engage a circumferential groove 27 formed around the outer periphery of the plug 17 when the plug is inserted into the socket 1. Axially slidably fitted over the socket 1 is a sleeve 13 having an internal annular protrusion which is urged by a spring 14 into engagement with the locking balls 12 to press the balls downwardly. The socket has a seal ring 68 adapted to contact the outer periphery of the plug 17 to provide a seal therebetween when the plug is received in the socket.

The plug 17 comprises a main cylindrical body 18 having a flow passage 19 extending therethrough. Axially slidably mounted in the flow passage 19 is a generally cylindrical valve member 20 for opening and closing the flow passage 19. The valve member 20 comprises a cylindrical portion 22 and a valve head portion or closed front end portion 74, said cylindrical portion being formed with radial fluid ports 31 adjacent the head portion 74. The main cylindrical body 18 has an inner annular protuberance 32 defining a valve seat with which the valve head portion 74 is adapted to be in sealing engagement to close the flow passage 19 in the same manner as with the socket 1.

A compression spring 77 is compressed between the main cylindrical body 18 and the valve member 20 to urge the latter into abutment with the valve seat 32.

According to the present invention, at least those portions of the plug 17 which will be in contact with fluid during the use, which are the main cylindrical body 18, valve member 20 and compression spring 77 in the illustrated embodiment, are formed of fluorocarbon resin, as with the socket 1.

Furthermore, according to the present invention, the compression spring 77 comprises a specially—shaped bellows made of fluorocarbon resin having continuous helical pleats or convolutions, as with the compression spring 59 in the socket 1. One end portion of the compression spring 77 is inserted in the cylindrical portion 22 of the valve member 20 and retained against a shoulder 78 formed on the inner periphery of the cylindrical portion 22 while the other end portion of the spring 77 is accommodated in a tubular spring holder 79 fitted in and fixed to the flow passage 19 and is retained against a shoulder 80 formed around the inner periphery of the spring holder 79. The rear open end of the cylindrical portion 22 of the valve 20 is normally spaced away from the opposed open end of the spring holder 79 to define therebetween a gap 81 for permitting retraction of the valve 20 to open the flow passage 19 when the socket 1 and the plug 17 are coupled together.

It is to be understood that upon the tube coupling being connected, the two opposed valve members 54 and 20 abut against each other and are both retracted to their open positions against the biasing forces of their respective springs 59 and 77 to open the flow passages 3 and 19 and provide communication therebetween.

When the socket and plug are coupled together, the locking balls 12 are depressed into the circumferential groove 27 to hold the socket and plug locked.

In order to disconnect the tube coupling, the sleeve 13 is manually moved axially inwardly against the force of the spring 14 until the balls 12 are released. The plug 17 may then be pulled out of the socket 1 as the balls 12 are moved out of the slot.

Figure 4:
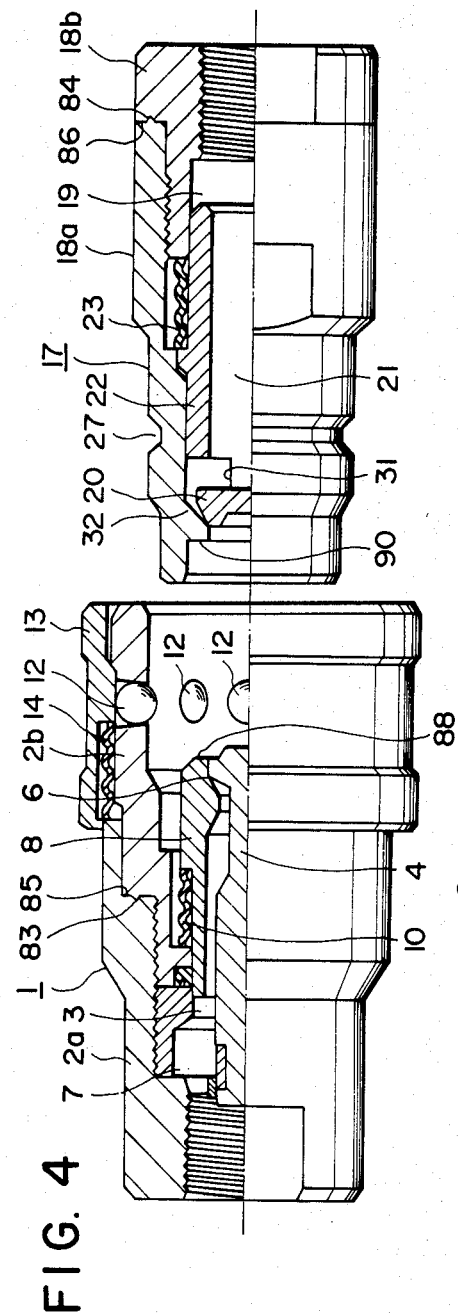
FIG. 4 is a side view, partly in cross-section, of the tube coupling according to still another embodiment of this invention.
Figure 5:
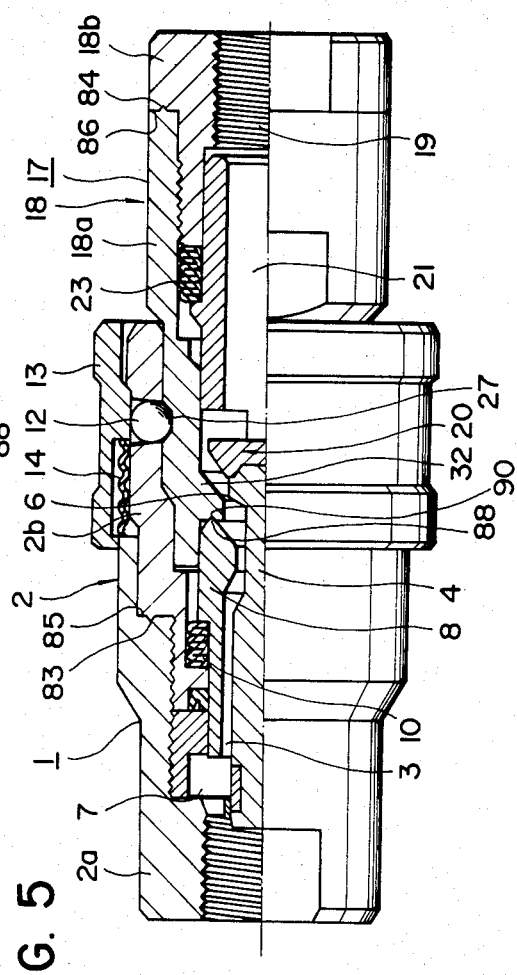
FIG. 5 is a side view similar to FIG. 4 but illustrating the coupling being connected.

FIGS. 4 and 5 illustrate a tube coupling according to this invention. This tube coupling is similar to that shown in FIGS. 1 and 2 not only in construction but also in that at least those portions of the socket and plug which will be exposed to fluid are formed of fluorocarbon resin and that the compression springs 10 and 23 are in the form of bellows made of fluorocarbon resin.

The distinction between the coupling in this embodiment and that shown in FIGS. 1 and 2 is that in this embodiment the main cylindrical body of the socket and/or the plug comprises a plurality of cylindrical members which are formed of fluorocarbon resins having different hardnesses, the surface of the harder cylindrical member in confronting relation with the surface of the less hard cylindrical member being formed with an annular angular (V-shaped) ridge.

More specifically, the main cylindrical body of the socket 1 comprises a plurality of cylindrical members, that is, an outer cylindrical member 2a and an inner cylindrical member 2b in the illustrated embodiment made of fluorocarbon resins having different hardnesses. Likewise, the main cylindrical body of the plug 17 comprises a plurality of cylindrical members—an outer cylindrical member 18a and an inner cylindrical member 18b in the illustrated embodiment made of fluororesin resins having different hardnesses. The harder cylindrical members 2b and 18a are formed with annular angular ridges 83 and 84, respectively on the surfaces thereof confronting with surfaces of the corresponding cylindrical members 2a and 18b.

When the cylindrical members 2a and 2b and the cylindrical members 18a and 18b are assembled together as shown in FIGS. 4 and 5, the annular angular ridges 83 and 84 on the cylindrical members 2b and 18a, respectively bite into the confronting surfaces of the cylindrical members 2a and 18a, respectively to establish a seal therebetween. There is thus no need for providing seal rings between the cylindrical members, as is the case with the embodiment shown in FIGS. 1 and 2.

Furthermore, according to the present invention, two opposing cylindrical members of the socket and plug having surfaces adapted to be brought into abutting engagement with each other when the socket and plug are coupled may be formed of fluorocarbon resins having different hardnesses. Those two cylindrical members are the cylindrical valve member 8 of the socket and the outer cylindrical member 18a of the plug in the illustrated embodiment. The harder cylindrical valve member 8 is formed on its end surface with an annular angular projection 88 which is adapted to be brought into biting, engagement with the surface 90 of the cylindrical member 18a to establish a seal therebetween when the coupling is connected.

It is to be appreciated that this embodiment provides the additional advantage of eliminating the need for seal rings while retaining all the advantages provided by the embodiment of FIGS. 1 and 2.

The above description is included to illustrate the preferred embodiments of the present invention and is not meant to limit the scope of the invention. The scope of the invention is to be limited only by the appended claims. From the above description, many variations will be apparent to one skilled in the art that would be encompassed by the spirit and scope of the invention.

We claim:

1. A tube coupling of the type having a socket and a plug, each having a fluid flow passage extending therethrough, and valve means mounted in the flow passage through at least one of the socket and plug for axial movement between a first position for closing said flow passage and a second position for opening said flow passage, said valve means being normally biased towards said first position by spring means when said socket and plug are disconnected, and adapted to be moved to said second position when the socket and plug are coupled together, characterized in that at least those portions of said socket and plug which will be exposed to fluid during the use are formed of fluorocarbon resin, said spring means being disposed in said flow passage and comprising bellows made of fluorocarbon resin having continuous helically extending pleats.

* * * * *